April 25, 1933. F. R. WALLACE ET AL 1,905,020
AUTOMATIC EQUALIZING SUPPORT
Filed Nov. 8, 1930 3 Sheets-Sheet 1
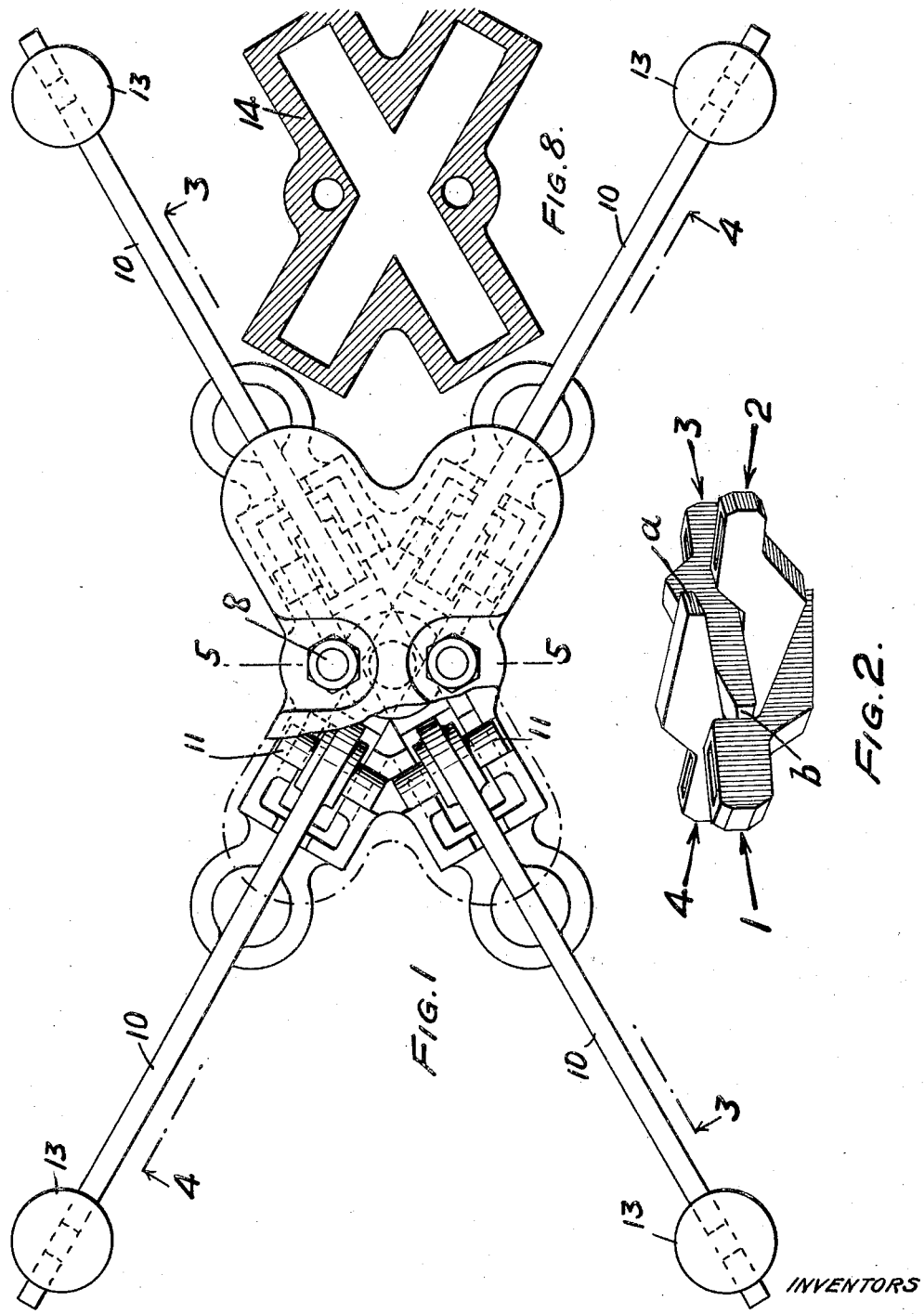
WITNESS:
Robt R Kitchel
INVENTORS
Frank R. Wallace
John T. Ramsden
BY
Augustus B. Voorhees
ATTORNEY.

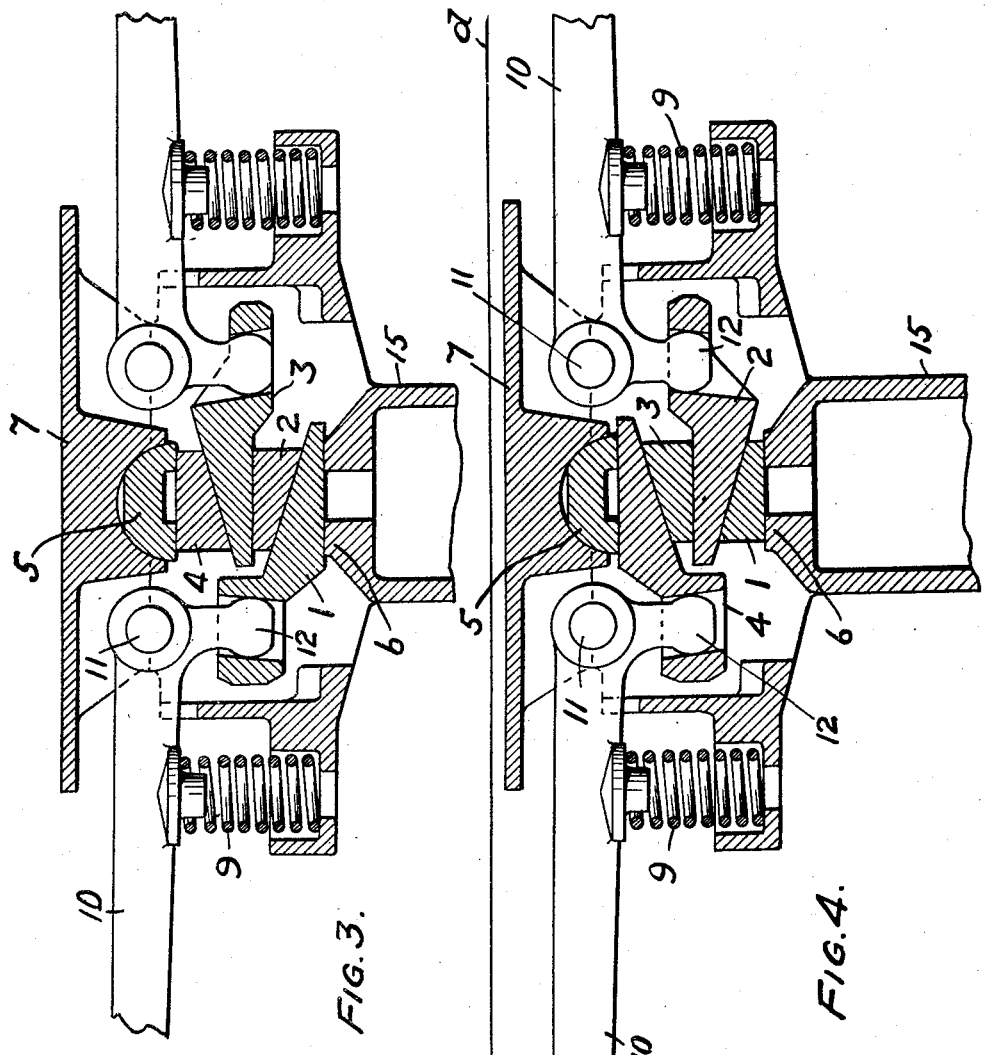

April 25, 1933. F. R. WALLACE ET AL 1,905,020
AUTOMATIC EQUALIZING SUPPORT
Filed Nov. 8, 1930 3 Sheets-Sheet 3
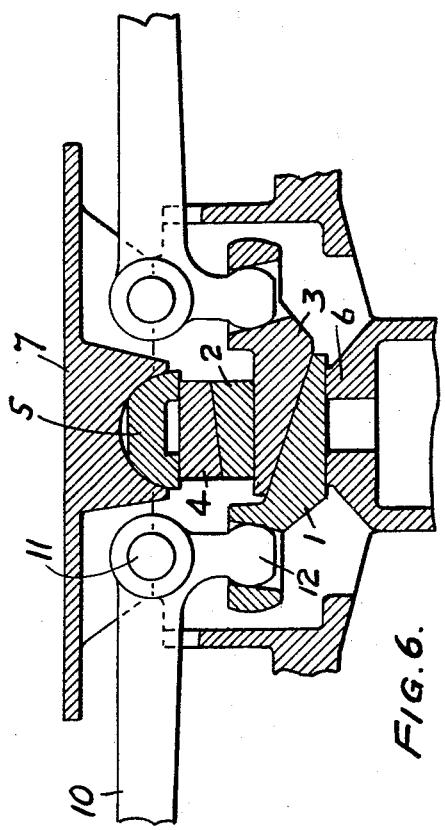
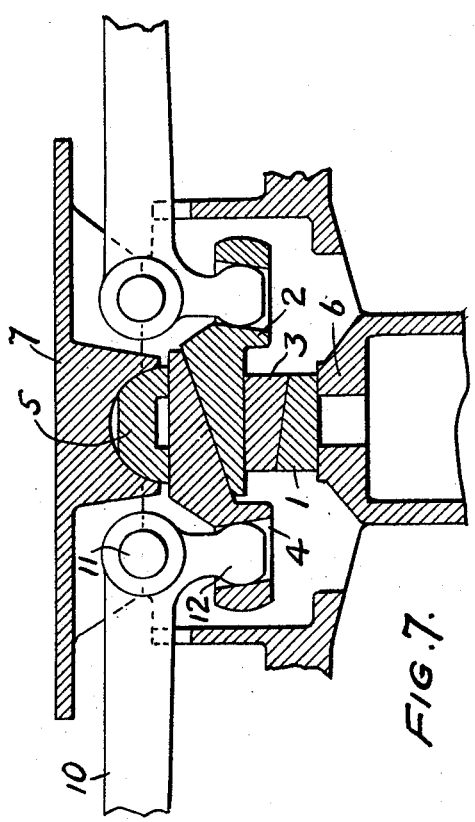
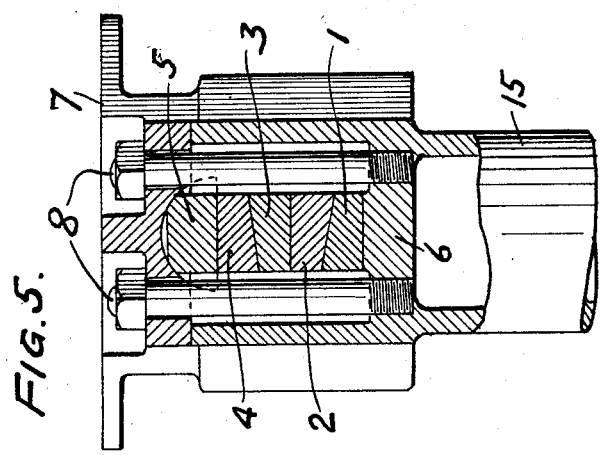
INVENTORS
Frank R. Wallace
John T. Ramsden
BY
Augustus B. Stoughton
ATTORNEY.
WITNESS:

Patented Apr. 25, 1933

1,905,020

UNITED STATES PATENT OFFICE

FRANK R. WALLACE AND JOHN T. RAMSDEN, OF PHILADELPHIA, PENNSYLVANIA, ASSIGNORS TO THE TABOR MANUFACTURING COMPANY, OF PHILADELPHIA, PENNSYLVANIA, A CORPORATION OF PENNSYLVANIA

AUTOMATIC EQUALIZING SUPPORT

Application filed November 8, 1930. Serial No. 494,330.

The principal object of the present invention is to provide an equalizing support which will automatically adjust itself to the surface, or to irregularities thereof, of an object deposited upon it and which will support the object immovably in the position in which it was deposited even though the weight of the object is unbalanced.

One, but not the only, use of the device is to receive and support flasks, molds, core boxes and the like.

Other objects of the invention will appear from the following description at the end of which the invention will be claimed, and the invention may be said, generally stated, to comprise a group of contacting wedges and abutments between which they are arranged together with means for retracting and loosening the wedges in respect to the abutments when the support is unloaded, and individual means for each wedge adapted to project the wedges into jamming position with respect to the abutments when the support is loaded.

The invention also comprises the improvements to be presently described and finally claimed.

Reference is hereby made to our copending application, Serial No. 396,980, filed Oct. 3, 1929.

Referring to the drawings

Figure 1 is a top or plan view with parts broken away of an equalizing support embodying features of the invention.

Fig. 2 is a perspective view somewhat diagramatically illustrating one arrangement of the wedges detached.

Fig. 3 is a sectional view taken on the line 3—3 of Fig. 1 looking in the direction of the arrows.

Fig. 4 is a similar view taken on the line 4—4 of Fig. 1.

Fig. 5 is a sectional view taken generally on the line 5—5 of Fig. 1.

Fig. 6 is a view similar to Fig. 3 illustrating a modification.

Fig. 7 is a view similar to Fig. 4 illustrating the same modification as Fig. 6, and Fig. 8 is a horizontal sectional view of a frame shown in Fig. 1.

Referring to the drawings, more particularly Figs. 1 to 5 and 8, 1, 2, 3 and 4 are the wedges of a group, and they are disposed in converging direction. Attention is called to the fact that the mate wedges of each pair of wedges enters the group between the mate wedges of another pair of wedges, that is to say, that the wedges operating in the same line are called mate wedges so that the wedges 1 and 3, which are mates, enter between the wedges 2 and 4, which are mates. The reason for this arrangement will hereinafter appear. It so happens that the lines in which the mate wedges operate cross each other at an angle other than 90°, as will be apparent in Fig. 1, and when that is the case the contacting faces of the wedges may be oppositely beveled as indicated at $a$ and $b$ in Fig. 2. However, that is not necessary because use may be made of a universal bearing 5 as a part of one of the abutments. 6 is one of the abutments, and 7 is the other abutment, and these abutments are held in fixed spaced relation, for example, by means of bolts 8, Fig. 5. There are means for retracting and loosening the wedges in respect to the abutments when the support is unloaded. There are springs 9 of which four and their accessories are shown, but since they are duplicates one will be described. Each spring 9 acts upon an arm 10 pivoted at 11 in bearings between the lower and upper abutments or members 6 and 7, and having a toe 12 shown as of generally spherical form and working in a slot in one of the wedges. The arms 10 also are provided with pads 13 which may be moved along them and which accommodate the object to be supported. 14, Fig. 8, is a guide frame in which the wedges are movably arranged. In the present embodiment of the invention the lower abutment is supported on top of a column 15.

The operation of the automatic equalizing support above described may be explained as follows:

Assuming that the wedges are loose between the abutments under the action of the springs 9, the pads 13 may be said to be in elevated position. If an object, of which the line $c$—$d$ may indicate the surface that is to be supported on the support, is placed upon the pads 13, the object will be supported on the pads in exactly the same position that it was in when it was placed upon the pads because even if the surface of the object is inclined or is irregular as it comes to rest, it will be immovably supported in the position that it occupies because its weight acting through the pads 13 on the arms, appropriately shifts the wedges and jams them between the abutments, so that no subsequent movement of the wedges or of the arms or of the object can take place. When the entire weight of the object is carried by the support, the wedges are jammed and no further movement can occur even if the weight of the object is unbalanced, and this is due to the arrangement of the wedges which has been described by stating that the wedges operating in one line are alternated with the wedges operating in a line crossing the first mentioned line.

The construction and mode of operation of the modification shown in Figs. 6 and 7, are as above described except that the wedges, herein referred to as mate wedges, acting in the same line, contact with each other, and while this arrangement is satisfactory for balanced loading and for some unbalanced loading, it is not immovable in the case of considerable unbalanced loading.

It may be remarked that where the mate wedges are arranged in a straight line, as in Figs. 6 and 7, the pair may slip under severely unbalanced loading without relative movement of the individual wedges, but this cannot occur where the wedges are arranged as in Fig. 2.

It is a feature of the invention that as the weight of the object is received on the arms 10, the arms freely push the wedges inward according to the level or inequalities in level of the face of the object that contacts with the pads 13 until finally even a single wedge may lock the whole group of wedges.

It will be obvious to those skilled in the art to which the invention relates that modifications may be made in details of construction and arrangement and matters of mere form without departing from the spirit of the invention which is not limited to such matters or otherwise than the prior art and the appended claims may require.

We claim:

1. An automatic equalizing support comprising top and bottom abutments with space therebetween a plurality of pivoted arms, and a group of contacting movable wedges occupying said space and cooperating with said abutments so as to clamp upon movement of said arms, said arms being connected with said wedges.

2. An automatic equalizing support including top and bottom abutments with space therebetween, a plurality of pivoted arms, a plurality of movable wedges cooperating with said arms and arranged in said space to clamp against said abutments, and universal joints between said arms and said wedges.

3. An automatic equalizing support comprising a top member, a bottom member, cooperating bearings formed on said top member and said bottom member, a plurality of arms mounted in said bearings, and a plurality of wedges cooperating with said arms and adapted to be clamped between said top member and said bottom member by movement of said arms.

4. An automatic equalizing support comprising a top member, a bottom member, a plurality of arms, and a plurality of wedges cooperating with said arms and adapted to be clamped between said top member and said bottom member by movement of said arms.

5. An automatic equalizing support comprising a top member, a bottom member, a plurality of arms, a spring pressing each arm to extreme position in one direction, and a plurality of wedges cooperating with said arms and adapted to clamp between said top member and said bottom member upon movement of said arms in the opposite direction.

6. An automatic equalizing support comprising a top member, a bottom member, a plurality of arms, a bearing, and a plurality of wedges cooperating with said arms and adapted to clamp against said top member and said bottom member through said bearing upon actuation of said arms.

7. An equalizing support comprising, in combination, a group of contacting wedges individually free for movement towards and away from the center of the group, means for limiting the movement of the wedges towards the center of the group thereby jamming them, and load receiving supports operatively connected with individual wedges and adapted to retract the wedges from the center of the group when the support is unloaded and to project the wedges towards the center of the group and jam them when the support is loaded.

8. An equalizing support comprising, in combination, a group of contacting wedges, relatively fixed elements between which the group of wedges is arranged and which are spaced apart sufficiently to allow free movement of the individual wedges towards jamming position and to arrest the movement of the wedges to cause them to jam, load receiving means operatively connected with the wedges and adapted to position them for individual movement when the support is unloaded and to jam them between said fixed elements when the support is loaded.

9. An equalizing support comprising, in combination, relatively fixed elements arranged in spaced relation, a group of contacting wedges arranged between said elements and adapted in some positions to partially fill the space between them and in other positions to jam between them, supports for receiving the load, and means cooperating with the supports and wedges and adapted to position the supports in load receiving position and the wedges in position for partially filling the space between the element and said means further adapted to concentrate the group of wedges and jam them between said elements under deposition of the load on the supports.

10. An equalizing support comprising a group of contacting wedges and complemental abutments between which the wedges are arranged, means for retracting and loosening the wedges in respect to the abutments when the support is unloaded, and an individual means for each wedge adapted to project the wedges into jamming position with respect to the abutments when the support is loaded.

11. An equalizing support comprising, in combination, spaced abutments, a group of contacting wedges arranged between the abutments and disposed in converging directions, the mate wedges of each pair of wedges entering the group between the mate wedges of another pair of wedges, means for retracting and loosening the wedges in respect to the abutments when the support is unloaded, and an individual means for each wedge adapted to project the wedges into jamming position with respect to the abutments when the support is loaded.

12. An equalizing support comprising, in combination, spaced abutments, a group of contacting wedges arranged between the abutments and disposed in converging directions, the mate wedges of each pair of wedges entering the group between the mate wedges of another pair of wedges, the contacting faces of the wedges being oppositely beveled, means for retracting and loosening the wedges in respect to the abutments when the support is unloaded, and an individual means for each wedge adapted to project the wedges into jamming position with respect to the abutments when the support is loaded.

FRANK R. WALLACE.
JOHN T. RAMSDEN.